United States Patent [19]

Sumner

[11] Patent Number: 4,586,883
[45] Date of Patent: May 6, 1986

[54] DIAPHRAGM PUMP OR MOTOR DEVICE

[75] Inventor: Leslie Sumner, Bath, England

[73] Assignee: Gallaher Limited, London, England

[21] Appl. No.: 708,539

[22] Filed: Mar. 5, 1985

Related U.S. Application Data

[63] Continuation-in-part of Ser. No. 468,488, Feb. 22, 1983, abandoned, which is a continuation of Ser. No. 211,244, Nov. 28, 1980, abandoned.

[51] Int. Cl.$^4$ ............................................. F04B 43/12
[52] U.S. Cl. ..................................................... 417/477
[58] Field of Search ................................. 417/474–477

[56] References Cited

U.S. PATENT DOCUMENTS

| | | | |
|---|---|---|---|
| 2,519,642 | 8/1950 | Ford | 417/477 |
| 2,885,966 | 5/1959 | Ford | 417/477 |
| 3,216,362 | 11/1965 | Hewko | 417/477 |
| 3,829,251 | 8/1974 | Schwing | 417/477 |

FOREIGN PATENT DOCUMENTS 1900478  9/1970  Fed. Rep. of Germany ...... 417/477

Primary Examiner—Richard E. Gluck
Attorney, Agent, or Firm—Fleit, Jacobson, Cohn & Price

[57] ABSTRACT

A material handling device such as a pump, including a first housing part 12 having an internal surface 12A surrounded by a peripheral surface 12B, 12C facing in generally the same direction as the internal surface. A substantially longitudinally inextensible flexible diaphragm has its periphery clamped on the first clamping surface by a cooperating second clamping surface 16B, 16C, the second housing part 16 carries a rotary member 17 on which are mounted three rollers 18. A chamber 10 is formed between the diaphragm and the internal surface. Upon rotation of the rotary member, the rollers sequentially urge the diaphragm onto the internal surface to form a constriction which traverses the chamber and moves the constriction from one port 13 to another port 14 formed in the first housing part. The configuration of the pump is such that, as at least three deflectors move sequentially over the diaphragm, the sum of the distances measured along the diaphragm between the clamping points 12C,16C of the diaphragm, and the deflectors 18 adjacent thereto, and where appropriate, between the adjacent deflectors 18 remains substantially constant, thus allowing a substantially inextensible membrane to be used.

7 Claims, 3 Drawing Figures

DIAPHRAGM PUMP OR MOTOR DEVICE

The present invention is a continuation-in-part of application Ser. No. 468,488 filed Feb. 22nd 1983, now abandoned, which was a continuation of application Ser. No. 211,244 filed Nov. 28th 1980 (now abandoned).

The invention relates to a diaphragm pump or motor device. Rotary pumps have already been proposed of the so-called "peristaltic" type, which include a flexible tube bent in an arc of a circle, the tube being squeezed by a plurality of rollers, carried on a rotating member, which make contact with the tube at angularly spaced positions. This arrangement results in "slugs" of the fluid carried in the tube being pushed forward from the inlet of the tube to its outlet.

Such pumps are particularly suitable for services which require the fluid being pumped to be kept isolated from the mechanism itself, but its disadvantage is that the tube, if not restrained, "walks" in the direction of the of the outlet. In consequence, the anchoring of the tube to prevent this is a problem which increases with the size of the tube and the viscosity of the fluid being pumped. It is a further disadvantage of this type of pump that, when pumping "heavy" substances, such as concrete, the tube tends to collapse at the inlet end and it is necessary to evacuate the chamber in which the pump tube operates in order to overcome this tendency.

Another disadvantage of this type of pump is the large effort required to distort the tube, especially when heavy duty tubes are used, e.g. in pumping concrete which results in low mechanical efficiencies.

Diaphragm pumps have been proposed in German Pat. No. 6243, German specification No. 1900478, British Pat. No. 562409, U.S. Pat. No. 2,519,642 which include a housing having an internal surface and a flexible resilient diaphragm mounted within said housing and secured thereto to form with the internal surface, a chamber. First and second ports communicate with the chamber and one or two deflectors are each operable sequentially on the face of the diaphragm remote from the chamber, to urge the diaphragm towards the internal surface to form a closure which traverses the chamber. As the closures each move from the first to the second port, one of the closures is terminated after the succeeding closure has been initiated.

A disadvantage of such a construction is that there is a necessity for the diaphragm to be longitudinally resilient, to enable it to take up the necessary shapes, and there is a tendency for the diaphragm to flex towards the low pressure side of the pump, thus causing the "slug" of material being pumped to be of small volume. For this reason, pumps of this nature are limited both in their size and by the low rotational speeds at which they can operate.

U.S. Pat. No. 3,829,251 describes a belt type pump which is of the general peristaltic nature, and in which a belt is clamped at two opposite ends and is movable with its side edges in rubbing contact with the side of a pumping chamber. Again there are two deflector members and this pump has similar problems to those of the pumps described above with the additional problem of leakage of fluid past the edges of the belt. U.S. Pat. No. 3,216,362 discloses a further form of belt type pump involving the use of three deflectors, but with the addition of three spring-loaded sealing vanes and several very narrow cross-section passages within the walls of the pump housing. The purpose of such a pump is to produce a significant pressure rather than to attempt to pump large quantities of fluid.

British Pat. No. 208477 and U.S. Pat. No. 2,794,400 disclose diaphragm pumps having three and four deflectors respectively, but here again the general resilience of the diaphragm produces the inherent problems indicated above. Finally U.S. Pat. No. 2,519,642 discloses a two roller deflector mechanism mounted in a generally cylindrical diaphragm which is provided, on its internal surface with a steel band. Because of the provision of two rollers and the mounting of the inlet and outlet adjacent one another on one side of the axis of rotation the rotor assembly, such a pump is only capable of handling a very limited quantity of fluid.

It is now proposed, according to the present invention, to provide a diaphragm pump or motor device comprising a rotary member rotatable about an axis; at least three deflectors mounted on said rotary member; a first housing part; a curved internal surface on said first housing part, said curved internal surface forming an arc of a circle centered on said axis; a first peripheral clamping surface on said first housing part surrounding said internal surface and facing substantially in the same direction as said internal surface, said first peripheral clamping surface having parallel curved first side clamping portions, one on each lateral side of said curved internal surface and first end clamping portions, extending transversely to said side clamping portions, at opposite ends of said curved internal surface; a flexible diaphragm having end edge parts and side edge parts overlying said first end clamping portions and said first side clamping portion respectively; a longitudinal reinforcement in said diaphragm rendering it substantially longitudinally inextensible and said diaphragm having a chamber-forming surface overlying said curved internal surface and said first curved peripheral clamping surface, said chamber-forming surface of said diaphragm forming, with said internal surface, a chamber; a second housing part; a second curved peripheral clamping surface on said second housing part, said second peripheral clamping surface having parallel curved second side clamping portions and second end clamping portions shaped to overlie that part of the diaphragm overlying said curved first side clamping portions and said first end clamping portions respectively, effective to clamp said side parts and said end parts of said diaphragm sealingly against the first peripheral surface, with the end edge parts longitudinally spaced and the side edge parts laterally spaced; said first and second side clamping portions being disposed on arcs of circles centered on said axis; first and second ports in said first housing part communicating with spaced portions of said chamber in the vicinity of the clamped end edges of said diaphragm, the axis of rotation of said rotor being positioned generally between said first and second ports; said at least three deflectors being movable, as said rotary member rotates, longitudinally of the diaphragm sequentially on the face of said diaphragm remote from said chamber-forming surface, effective to urge the diaphragm against or towards said internal surface, to form a closure or constriction which traverses the chamber and to move the closure or constriction from one port to the other port, one such closure or constriction being terminated after the succeeding closure or constriction is initiated; the first and second end edge clamping portions on said first and second peripheral clamping surfaces being positioned, relative to said rotor and said curved internal surface, such that, as said diaphragm is deformed by said at least three deflector means as they move sequentially along a path on said face of the diaphragm remote from the chamber, the diaphragm is caused at all positions to be disposed in a series of substantially straight lines between each first and second end clamping parts and the adjacent deflector and where appropriate, between adjacent deflectors, so that the sum of distances measured along the diaphragm, between the clamped end edge parts of the diaphragm remains a substantially constant minimum value.

With such a construction, the diaphragm is substantially longitudinally inextensible and because of the choice of the position of the first and second end clamping portions, the length of the diaphragm is caused to remain a substantially constant minimum value, whatever the position of the deflectors. Thus the diaphragm is at all positions disposed in a series of substantially straight lines between the end edge clamping parts and around the deflectors, and this prevents the diaphragm from collapsing into the reduced pressure zone near the inlet port, or materially extending into the housing interior at the pressure zone near the outlet port. This enables the pump to operate at relatively higher speeds and pressures for lighter materials including slurries. The pump is also capable of handling very heavy materials, such as mortar and even concrete quite adequately.

The inextensibility is produced by reinforcement fibers which extend longitudinally, that is in the direction of movement of the deflectors. The reinforcement should be within the thickness of the diaphragm, but preferably closer to the surface contacted by the deflectors so as to keep the inextensibility as close as possible to the deflectors and this also helps to reduce wear. In a preferred construction, those portions over which the deflectors do not run are provided with a reinforcement in the form of fibers which extend at an angle, for example 45 degrees, to the longitudinal direction, these providing strength, but allowing flexing of the diaphragm which is necessary to allow the diaphragm to change its shape as the deflectors move over its surface. An additional flexible sheet may be provided on the face remote from the chamber, and secured at least at the inlet port end, to provide a wear sheet for the deflectors and to give adjustment to compensate for any inaccuracies in casting or in the thickness of the diaphragm, and thus to ensure that the diaphragm fits snuggly against the internal surface, when deflected by the deflectors.

In order to enable the diaphragm to be replaced readily, and to hold it securely, the diaphragm needs to be clamped properly. This is achieved by the housing including first and second housing parts, each of which are provided with parallel curved side clamping portions, extending one on each lateral side of the curved internal surface and end clamping portions extending transverse to said side clamping portions at opposite ends of the curved internal surface. The flexible diaphragm has side edge parts and end edge parts which are clamped between these side clamping portions and end clamping portions respectively so that the diaphragm is clamped around its full periphery.

The curved side clamping portions on the first housing parts are curved along an arc centered on the axis of rotation of the rotary member carrying the deflectors, which are preferably rollers.

The diaphragm is preferably molded so that its shape is such that it remains substantially undistorted when it is clamped in place and before the deflectors are placed in contact with the surface of the diaphragm remote from the internal surface of the housing. This construction means that the diaphragm only has to flex a small amount. As indicated, the reinforcement may include, in addition to the longitudinal fibers, other fibers which are arranged at an angle thereto the other parts of the diaphragm to give strength, but to allow the slight flexing necessary for the diaphragm to distort without stretching in the direction of movement of the deflectors.

In a further arrangement, the diaphragm further comprises two longitudinally extending corrugations spaced from the longitudinal edges of the diaphragm, said corrugations facilitating movement of the portion of said diaphragm between said corrugations with respect to the clamped side edge parts of said diaphragm.

Further, to reduce wear, it is possible to provide means to cause the rollers to continue rotation, even when they are not in contact with the diaphragm.

An additional port may be provided in the chamber at a location intermediate the first and second ports, means being provided to set the deflectors in predetermined position relative to the ports, whereby the device can be used not as a pump, but as a diverter valve or multiport diaphragm valve. This is a simple construction of valve and the arrangement could be such that the device is operated first of all as a pump, with the intermediate port shut off, the intermediate port is then opened, with the deflectors in a fixed position, so that flow will continue in order to maintain a syphon.

In order that the present invention may more readily be understood, the following description is given, merely be way of example, reference being made to the accompanying drawings, in which.

Figure 1:
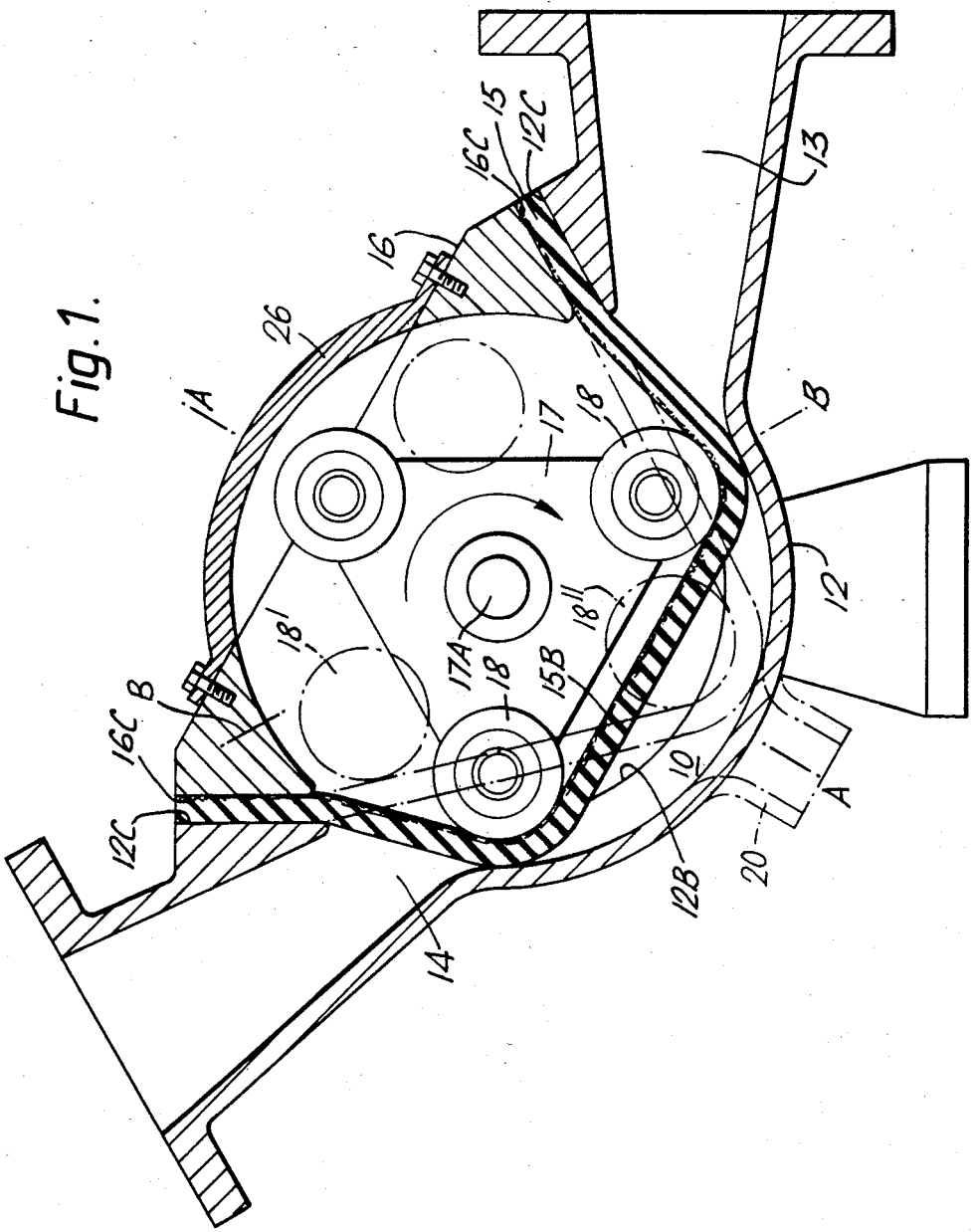
FIG. 1 is a section through one embodiment of pump made according to invention.
Figure 2:
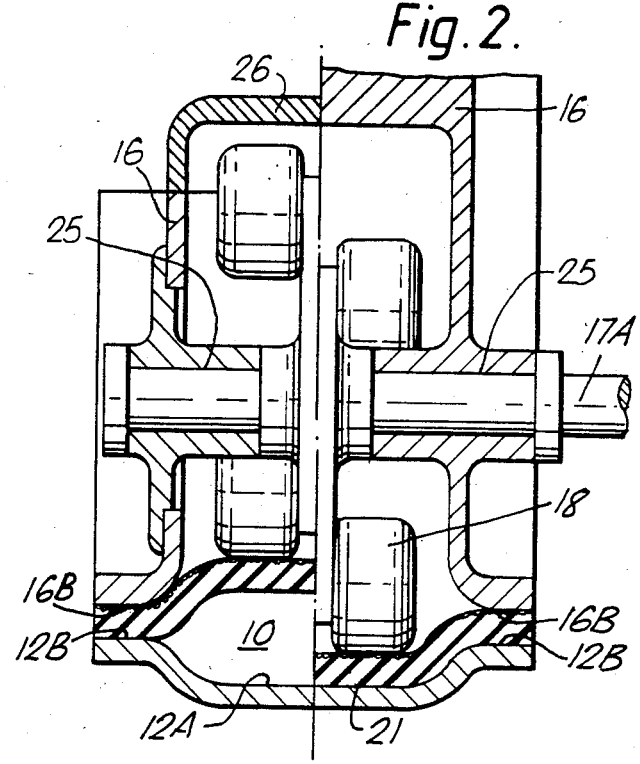
FIG. 2 is a section in two parts, the first on the line AA the second on the line BB of the pump illustrated in FIG. 1.

Referring first to FIGS. 1 and 2 of the drawings, the pump illustrated comprises a first housing part 12 and a second housing part 16 mounted thereon. The housing part 12 includes a central dished portion having an upper internal surface 12A blending into a first port 13 and a second port 14. As can be seen from FIG. 2, the curved upper internal surface 12A has associated therewith, on each side, a raised side clamping portion 12B, which faces generally upwardly, that is, it faces in the same direction as the surface 12A. Curved side clamping portions 12B end with a straight surface 12C to form an end clamping portion which extends above ports 13 and 14. The side clamping portions 12B and the end clamping portion 12C together define a peripheral clamping surface of the first housing part. Thus, the clamping portions 12B and 12C completely surround the periphery of the curved internal surface 12A and the ports 13 and 14.

The second housing part 16 is provided with curved side clamping portions 16B which cooperate with the curved side clamping portions 12B as well as straight end clamping portions 16C which cooperate with the end clamping portions 12C, so that the portions 16B and 16C together define a second peripheral clamping surface.

Figure 3:
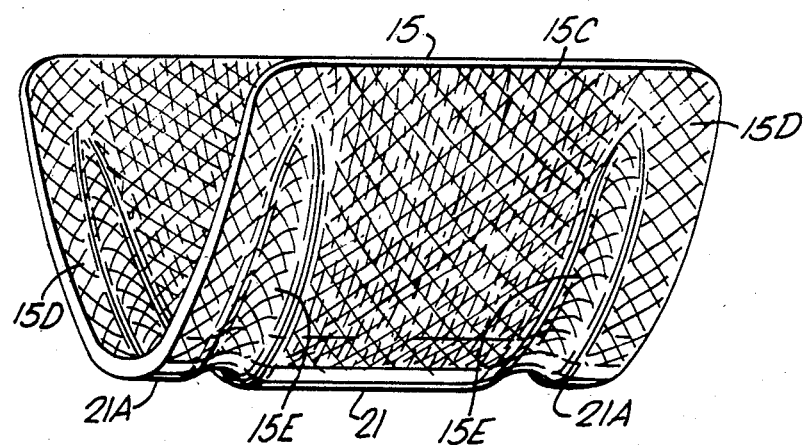
FIG. 3 is a perspective view of a diaphragm as used in the pump FIGS. 1 and 2.

The clamping portions 12B, 12C and 16B, 16C are used to clamp the edge parts of a diaphragm 15, which is of the pre-molded structure illustrated in FIG. 3. As will be seen, it has a generally longitudinally extending corrugation 15E on each side and a central portion 21 which is lower than side edge clamping parts 21A which extends beyond the corrugations. The diaphragm also has end clamping parts which extend transversely across the diaphragm beyond the ends of the corrugations 15E to define, with the side clamping parts 21A a peripheral clamping portion of the diaphragm. The diaphgragm is molded with a reinforcement therein, including fibers 15C (FIG. 3) which extend longitudinally, that is from left to right in FIG. 1, in the central zone and include other reinforcements 15B in other parts, which are preferably at 45 degrees, thus on the bias, to allow for some flexing, the longitudinal fibers preventing extension in the longitudinal sense. These reinforcements are preferably placed on or just below the upper surface of the diaphragm.

Referring again to FIGS. 1 and 2, it will be seen that a rotary member 17 is rotatable about a central axis 17A and is mounted in bearings 25 in the second housing part 16. The central axis 17A is located generally between the ports 13 and 14, that is one port is to the left of the central axis and the other port to the right of the central axis as seen in FIG. 1. Member 17 carries three rollers 18 which can bear on the upper surface 15B of the diaphragm. The rollers urge the diaphragm at spaced locations towards, and preferably against, the upper surface 12A. In this condition, the surface 12A and the diaphragm lower surface 15A form a clamping chamber 10.

The particularly way in which the diaphragm is mounted enables it to be held very firmly and prevents any tendency for the diaphragm to "walk" as the rotary member 17 rotates in the direction indicated by the arrows.

Because of the configuration of the pump, the effective the length of the upper surface remains substantially constant. That is, the sum of the distances, measured along the diaphragm, between the clamping surfaces 12B, 16B at one end of the pump, and the adjacent roller 18, from that roller to the next roller, when two rollers are in contact with the diaphragm, and from the next roller to the other clamping surface 12B, 16B, remains constant regardless of the position of the rotor and regardless of whether one or two rollers are in contact. The positioning of the end clamping portions 12B, 16B relative to the rotor and the curved internal surface 12A is therefore such that the diaphragm is caused always to be disposed in a series of straight lines between each of the first and second end clamping part of the diaphragm, and the adjacent deflectors and, where appropriate, between two adjacent deflectors, so that the sum of distances measured along the diaphragm between the clamped end edge parts of the diaphragm remains a substantially constant minimum value.

This means that the diaphragm need not elongate at all due to the action of the rollers and it is for this reason that it has been possible to provide the longitudinal reinforcement 15C which indeed substantially prevents the diaphragm from elongating. The reinforcement 15B which is arranged on the bias prevents too much distortion but allows an adequate amount of distortion for the flexure of the diaphragm under the action of the rollers 18. As the rotary member 17 rotates, the constriction or closed off portion 10 is moved from the inlet 13 to the outlet 14 and, because there are at least three rollers 18, the capsule thus formed is always isolated from at least one of the ports. Because the sum of distances measured along the surface of the diaphragm from one clamping surface around the roller or rollers to the other clamping surfaces is constant, a positive pumping action can take place in an adequate manner. In other words, there is no tendency for the diaphragm to flex into the inlet port under the action of the suction pressure at the inlet port and there is no tendency for the diaphragm to flex away from the outlet port under the action of the pressure appearing at the outlet port. It will be appreciated that the closure caused by one roller is terminated after the succeeding closure is initiated.

The diaphragm clamping surface side portions 12B, 16B are so arranged that they partially form arcs of a circle with substantially the same center as the rotary member. The rollers 18 are shown as being freely rotatable, but it is contemplated that they could be caused to rotate continuously, thus to reduce the wear on the upper surface. An additional wear sheet of flexible material may be secured above the diaphragm at the right hand side, as viewed in FIG. 1, and extend over the full path covered by the rollers 18. This not only reduces wear, but can be used to adjust the thickness of the diaphragm to take up any manufacturing tolerances in the housing part 12.

The diaphragm is preferably molded so that it naturally has the shape illustrated in FIG. 3, that is with the lower and upper surface of the edge portions 21A having the same shape as the side portions and end portions 12B 16B of the clamping surfaces. Thus, as the roller moves, the amount of distortion will be first to one side of the pre-molded shape and then to the other, without ever causing any excess distortion.

The amount of diaphragm material in the molded and reinforced diaphragm on the surface length 15B (which remains substantially constant at all positions of the rollers adjacent to the rollers) is such that it is only slightly in excess of that which allows the roller to distort the diaphragm while avoiding rupture, but does not allow the diaphragm to deform further under negative pressure. The reinforcement of the diaphragm is not elastic and is molded to the diaphragm at or near the surface on which the rollers may contact. This not only reinforces the diaphragm to cater for negative and positive pressure development during the pumping cycle, but also reduces wear on the diaphragm which may be caused by the action of the rollers.

If the pump is provided with a modification indicated in phantom, that is with the intermediate port 20 at the center of the chamber 10, that is the center of the surface 12A, then the device can be used as a valve, by moving the member 17 to the position in which the rollers take up the positions 18' and 18" as illustrated in phantom. This connects the port 20 to the port 14 and disconnects the port 13. A similar symmetrical position could be assumed in which the port 13 is connected to the port 20, isolating the port 14. It is contemplated that if one rotates the member 17 continuously to cause the pumping, while shutting of the port 20, then the pump could be used to start up a syphon action, the pump then being moved to the other position communicating port 13 with port 20, allowing the syphon action to continue upon opening of the port 20.

It will be seen that the second housing part 16 is provided with a removable cover 20. One of the rollers 18 is also removably mounted on the member 17. The reason for this is that, because of the shaping of the diaphragm and the configuration of the pump, it is important to clamp the diaphragm around its full periphery before any of the rollers contacts the diaphragm, so that the diaphragm can take up its natural position without any distortion or strain thereon during clamping. Thus, in order to mount a new diaphragm the second housing part 16 is removed and the used diaphragm taken away and the new diaphragm put into position. The cover 26 is removed from the second housing part and one of the rollers is then taken off. The member 17 is rotated until the other two rollers are at the top, that is the zone of the removed roller is at the bottom. The second housing part is then put in place and bolted down. The dimensions of the rotary member 17 are such that the zone adjacent where the roller had been removed does not touch the diaphragm, so that during the clamping operation, no disturbance of the diaphragm can take place. The rotary member is then rotated until the location of the removed roller is at the top and the roller put back in place, whereafter the cover 26 can be fixed.

It has been found that unless this technique is used the diaphragm is distorted and the pumping action possible with this pump reduces and practically ceases.

It is thus important that the configuration of the pump should be chosen to give the necessary constant path length. This can be determined fully theoretically, but in practice, it has been found possible to design the pump empirically by taking a piece of flexible inextensible material, such as cord, fitting it around a model of the rotary member 17 and its rollers, and determining the position of the clamps which provides a fully tensioned cord at all times. This means that the pump designed to this configuration, that is by choosing the correct clamping positions of the ends of the diaphragm, will itself ensure that the diaphragm is always full tensioned, so that it extends in straight lines at all positions of the rotary member.

While the device has been described as a pump, it could equally well be used as a compressor or indeed as a motor.

The diaphragm must be flexible and is rendered inextensible by the longitudinal reinforcement. The reinforcement may include a central portion with fibers 15C extending longitudinally only, but in practice, the bias reinforcement 15D will extend across the full width of the diaphragm and the central portion the reinforcement can be made of an open mesh fabric which includes the longitudinal fibers 15C and other fibers at right angles thereto. This would make the central portion of the diaphragm inextensible both longitudinally and laterally, but the reinforcement in the corrugations and the side parts of the diaphragm will render the side parts laterally extensible.

I claim:

1. A diaphragm pump or motor device comprising, in combination:
   (a) a first housing part;
   (b) an internal surface on said first housing part;
   (c) a first peripheral clamping surface on said first housing part surrounding said internal surface and facing substantially in the same direction as said internal surface;
   (d) a flexible diaphragm which is substantially longitudinally inextensible and having a chamber-forming surface overlying said internal surface and said peripheral clamping surface, said chamber forming surface of said diaphragm forming with said internal surface a chamber;
   (e) a second housing part;
   (f) a second peripheral clamping surface on said second housing part shaped to overlie that part of the diaphragm overlying the first peripheral clamping surface, effective to clamp longitudinal and end edges of said diaphragm sealingly against said first peripheral clamping surface;
   (g) two longitudinally extending corrugations spaced from the longitudinal edges of the diaphragm, said corrugations facilitating movement of the portion of the diaphragm between said corrugations with respect to the clamped longitudinal edges of said diaphragm;
   (h) first and second ports in said first housing part communicating with spaced portions of said diaphragm in the vicinity of clamped end edges of said diaphragm; and
   (i) at least three deflector means movable longitudinally of the diaphragm sequentially on the face of said diaphragm remote from said chamber forming surface, effective to urge the diaphragm against or towards said internal surface, to form a closure or constriction which traverses the chamber and to move the closure or constriction from one port to the other port, one such closure or constriction being terminated after the succeeding closure or constriction is initiated, the configuration of the pump or motor device being such that, at said at least three deflector means move sequentially along a path on said face of the diaphragm remote from the chamber, the sum of distances measured along the diaphragm between the clamped end edges of the diaphragm remains substantially constant.

2. A device as claimed in claim 1, wherein a central portion of the width of the diaphragm is molded to take up a position nearer the curved internal surface than the side edge portions on either side thereof.

3. A device as claimed in claim 1 and further comprising an intermediate port, communicating with said chamber, and located between said first and second ports.

4. A device as claimed in claim 1, wherein said deflectors are mounted on said second housing part, whereby they can be removed when the clamping of said diaphragm is released.

5. A device as claimed in claim 1, wherein said deflectors are each rollers rotatably mounted on said rotary member.

6. A device as claimed in claim 1, wherein said diaphragm is molded to a shape corresponding to the shape of the curved internal surface and portions of said peripheral surface, so that, when said diaphragm is placed on said peripheral surface and clamped, it does not undergo any distortion.

7. A device as claimed in claim 6, wherein central portion of the width of the diaphragm is molded to take up a position nearer the curved internal surface than the side edge parts on either side therof.

* * * * *